May 23, 1967 V. J. KORKOWSKI 3,321,643

SIGNAL RESPONSIVE APPARATUS UTILIZING TUNNEL DIODE MEANS

Filed Nov. 25, 1964 2 Sheets-Sheet 1

INVENTOR.
VINCENT J. KORKOWSKI
BY Thomas J. Nikolai
ATTORNEY

United States Patent Office 3,321,643
Patented May 23, 1967

3,321,643
SIGNAL RESPONSIVE APPARATUS UTILIZING TUNNEL DIODE MEANS

Vincent J. Korkowski, Minneapolis, Minn., assignor to Sperry Rand Corporation, New York, N.Y., a corporation of Delaware
Filed Nov. 25, 1964, Ser. No. 413,730
18 Claims. (Cl. 307—88.5)

ABSTRACT OF THE DISCLOSURE

A search memory system match logic detector incorporating two tunnel diodes having their anodes intercoupled by a capacitor. Only the conjoint action of the switching of the first tunnel diode into its high level state by an input signal at the anode of the first tunnel diode and a clock signal at the anode of the second tunnel diode is capable of switching the second tunnel diode into its high level state. Subsequent input signals are unable to effect the voltage level of the second tunnel diode.

Search memory systems are systems in which typically a known search word is compared to a plurality of unknown memory words to determine a plurality of search functions such as answering the questions: what words in memory are equal to the search word?; what words in memory are equal to or greater than the search word?; or, what words in memory are equal to or less than the search word? The answers to the questions are typically the addresses in memory of the words satisfying the search function criteria. Many different well known search memory system arrangements are utilized; including arrangements storing the true and the complement of the memory words and arrangements storing only the true of the memory words to effectuate the necessary comparisons. See the following articles for discussions of some typical search memory systems: A Search Memory Subsystem for a General-Purpose Computer, Albert Kaplan, pp. 193–200, Proceedings—Fall Joint Computer Conference, 1963; Associative Memories, Alan Corneretto, pp. 40–55, Electronic Design, February 1, 1963; and, All-Magnetic Content Addressed Memory, Robert Lussier et al., pp. 92–98, Electronic Industries, March 1963.

The present invention is directed toward a detector that is capable of evaluating the output of a search memory array in a more efficient manner than was previously possible. Present research in search memory system is directed toward the development of detectors that are capable of accepting the extremely low level search memory array output signals without any amplification and performing the necessary "lock-out" of subsequent output signals coupled thereto. As present day search memory systems require a separate amplifier and a separate detector for each memory word it is apparent that large search memory systems require a considerable number of output (sense) amplifiers. To provide a practical (economy wise) search memory system it is therefore desirable that the sense amplifiers be eliminated with their function being absorbed by the associated detectors. Additionally, for many search memory functions it is necessary that the detectors react to only the first search memory output signal and thereafter to remain uneffected by any subsequent output signal coupled thereto; this function is termed "lock-out" in that any output signal subsequent to the first output signal is locked-out of the detector so as to produce no effect upon the detector's previously set state. The detector of the present invention accomplishes both of these functions in an improved manner in that it reacts to the low level search memory output signal and provides the necessary lock-out feature.

Accordingly, it is a primary object of the present invention to provide an improved detector that is capable of performing match logic when combined with a search memory system.

It is another object of the present invention to provide an improved detector that is capable of reacting to the first of a plurality of input signals and remaining in the state established by said first input signal regardless of the number of subsequent input signals coupled thereto.

It is another object of the present invention to provide a tunnel diode circuit that is capable of reacting to the low level signal of a memory array without intermediate amplification thereof.

It is another object of the present invention to provide a tunnel diode circuit whose output signal level is controlled by an externally controlled gate signal.

It is a further object of the present invention to provide a tunnel diode circuit whose input signal portion is A.C. coupled to its output signal portion.

These and other more detailed and specific objects will be disclosed in the course of the following specification, reference being had to the accompanying drawings, in which.

Figure 1:
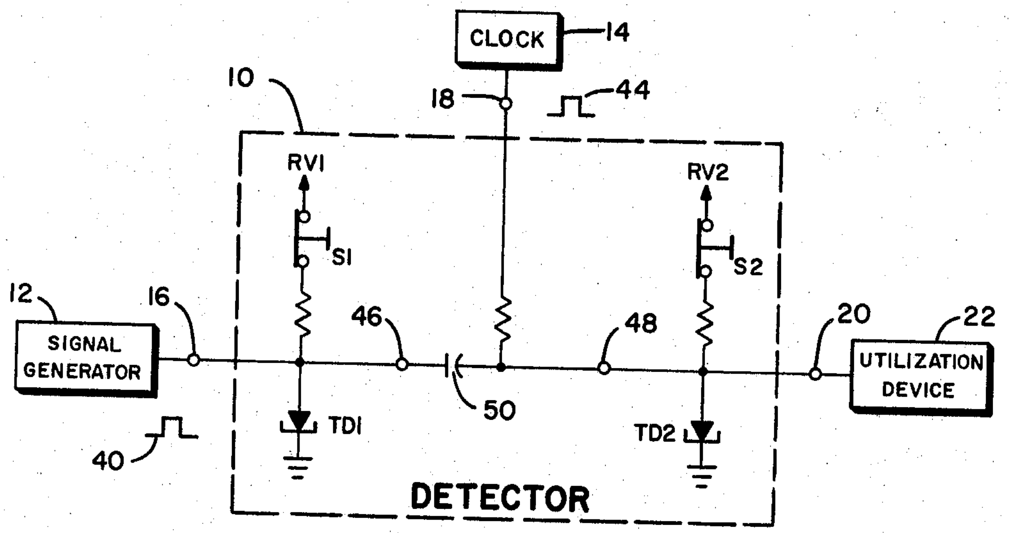
FIG. 1 is an illustration of a preferred embodiment of the detector of the present invention.

FIGS. 3*a* through 3*f* are illustrations of the various voltage signal levels associated with the detector of the illustrated embodiment of FIG. 1 when in its various operating modes.

Figure 4:
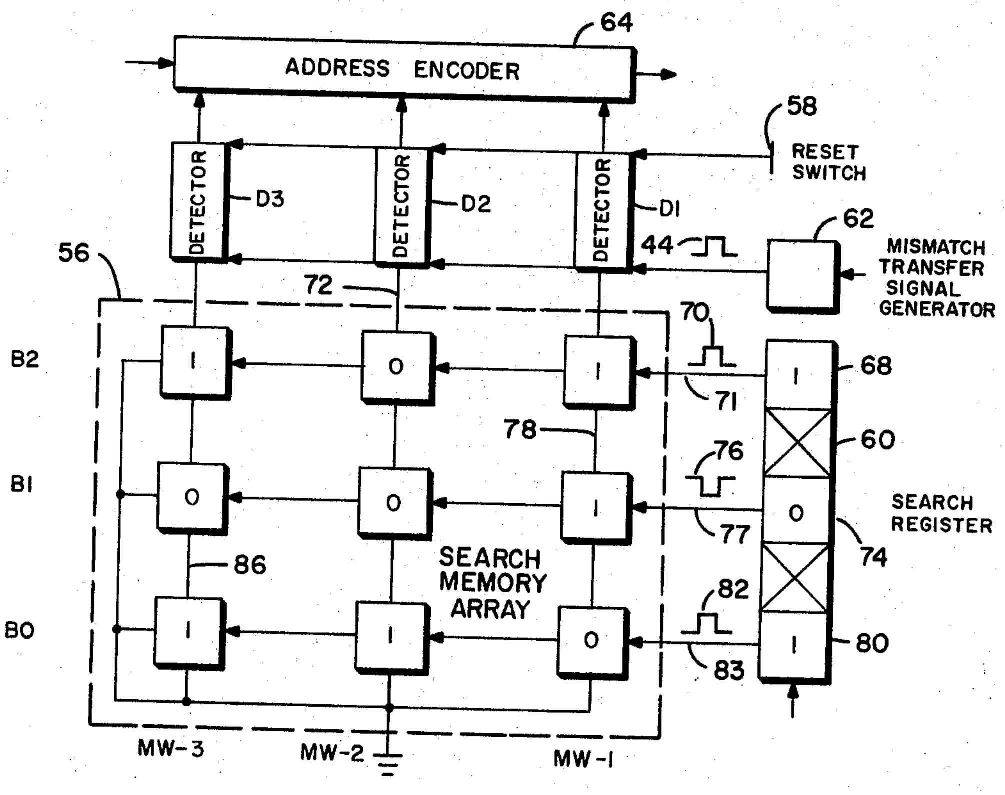

FIG. 4 is an illustration of a search memory system incorporating the detector of FIG. 1.

With particular reference to FIG. 1 there is illustrated a block diagram of a system incorporating the detector 10 of the present invention. With the reference potentials of RV1 and RV2 coupled to their respective terminals causing tunnel diodes TD1 and TD2 to be biased into their normal low voltage state and with signal generator means 12 and clock means 14 coupling no significant signals to their respective terminals 16 and 18, detector 10 couples an insignificant signal to its output terminal 20 and thence to utilization device 22. However, when signal generator 12 and clock means 14 concurrently couple significant signals to their terminals 16 and 18, respectively, detector 10 couples a significant signal to output terminal 20 and thence to utilization device 22.

As stated previously a primary object of the present invention is to provide a detector that is suitable for use in conjunction with a search memory wherein the detector is capable of being set by a first low level search memory output mismatch signal—of say 100 millivolts (mv.)—which detector is enabled by a second mismatch transfer signal and when once enabled by the concurrent application of said first mismatch signal and said second mismatch transfer signal effectively locks out the effect of any subsequently applied mismatch and mismatch transfer signals.

Figure 2:
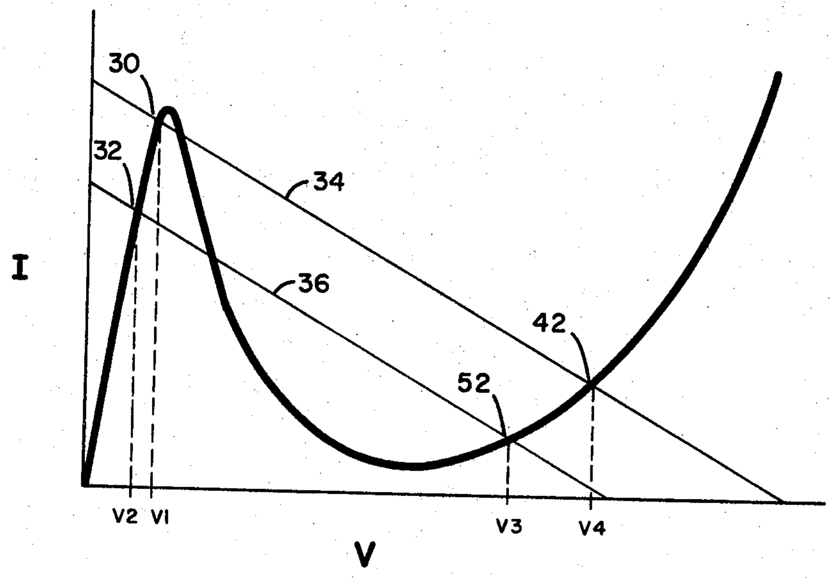
FIG. 2 is a graph of the conventional $I/V$ curve of the tunnel diodes of FIG. 1.
Figure 3A:
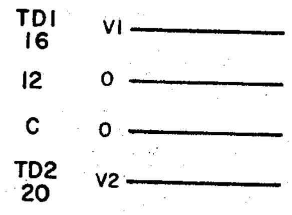

The preferred embodiment of the detector 10 utilizes tunnel diodes TD1 and TD2 as the active elements with the low or high voltage state of tunnel diode TD2 and output terminal 20 determining the significance of the previously applied signal coupled to its input terminal 16 and tunnel diode TD1. With reference to FIGURES 2 and 3 the operations of detector 10 when effected by the proper signals are as follows:

(1) When reference potentials RV1 and RV2 are coupled to their respective terminals, and when their respective signals are not coupled to terminals 16 and 18 by signal generator 12 and clock means 14, respectively—see FIG. 3*a*—TD1 and TD2 are biased into their normal low voltage states 30 and 32, respectively, as determined by the intersections of their respective load lines 34 and 36 with their $I/V$ curve—see FIGS. 2 and 3*a*.

Figure 3B:
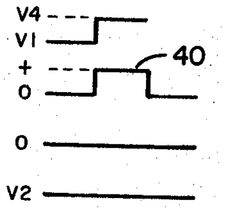

(2) When signal generator 12 couples signal 40 to input terimnal 16 but clock means 14 couples no signal to terminal 18—see FIG. 3*b*—TD1 is biased into its high voltage state 42 but TD2 remains at its low voltage state 32.

Figure 3C:
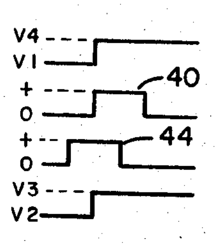

(3) When clock means 14 couples signal 44 to low terminal 18—see FIG. 3*c*—TD2 moves from its low voltage state 32 to voltage state 30. Now, when signal generator 12 concurrently couples signal 40 to terminal 16 TD1 moves from its low voltage state 30 to its high voltage state 42. The voltage change due to the change of the voltage state of TD1 from point 30 to point 42 is an A.C. coupled from terminal 46 to terminal 48 by capacitor 50, switching TD2 from its then voltage state 30 to the high voltage state 42. After termination of signals 40 and 44 TD1 and TD2 stabilize at their high voltage states 42 and 52, respectively.

Figure 3D:
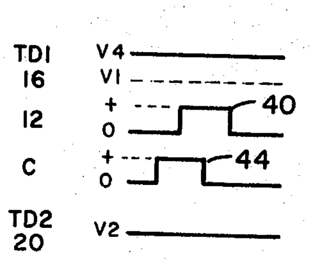

(4) If TD1 is initially in its high voltage state 42—see FIG. 3*d*—by a prior application of signal 40 to terminal 16 by signal generator 12, the subsequent coupling of signal 40 to terminal 16 by signal generator 12 and of signal 44 to terminal 18 by clock means 14 will not switch the voltage state of TD2 into its high voltage state 42 from its low voltage state 30. As TD1 is initially in its high voltage state 42, signal 40 will not switch the voltage state of TD1 due to the application of signal 40; therefore, there is no A.C. coupling of the TD1 switching signal through capacitor 50 to switch the voltage state of TD2 from its initial voltage state 30 to voltage state 42, as is required.

Figure 3E:
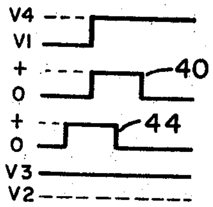
Figure 3F:
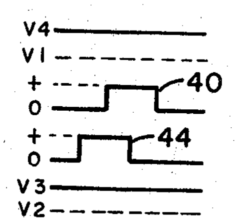

(5) When TD2 is initially in its high voltage state 52 it is obvious that no combination of signals 40 and 44 can permanently alter such state—see FIGS. 3*e*, 3*f*.

(6) TD1 and TD2 are reset into their initial set states—low voltage states—by the temporary removal of reference potentials V1 and V2 by means of switches S1 and S2, respectively.

With particular reference to FIG. 4 there is disclosed a preferred embodiment of the present invention as a detector for a search memory. A search register holds the word searched for or compared to with each bit of the multibit search word coupled serially to all the corresponding ordered bits of the plurality of words in memory. If a particular bit of the search word is a "1" it drives all the corresponding ordered bits of the memory words by a unique signal, as an example a positive pulse, while if a "0" it drives all the corresponding ordered bits of the memory words by a second unique signal, as an example a negative pulse. The memory elements of the search memory are such that if the bit in the search word matches the bit in the memory word no output signal is induced in the coupled sense line while if the bit in the search word does not match, i.e., mismatches, the bit in the memory word, an output signal is induced in the coupled sense line. The search is conducted by initially driving all the serially coupled corresponding highest ordered bits of the memory words according to the search word bit, with the search continued by bit serially driving the serially coupled corresponding ordered bits of the memory words from the highest to the lowest ordered bits of the search word. After the bit serial search is completed the detectors coupled to the sense lines have on their outputs, coupled to an address encoder, a high signal level indicative of a mismatch or a low signal level indicative of a match—see above discussion of FIG. 1.

For purposes of the present discussion assume that an equality search is to be conducted. This requires the performance of only one program search operation. For this operation a search word equal to the word to be searched for or to be compared to is inserted in a search register and a search operation is perfomed. After completion of the search operation the detector output lines couple respective match or mismatch signals to an address encoder that provides a signal indicative of the addresses of the words in the search memory that are equal to the search word.

With particular reference to FIG. 4 there is disclosed a search memory system incorporating the detector of FIG. 1. In this system the search memory array 56 has an illustrated capacity of three 3-bit memory words, MW–1, MW–2 and MW–3; each memory word is coupled to its associated detector, D1, D2 and D3. The operation of the detector of this system is as discussed with particular reference to FIGS. 1, 2 and 3 above. After an initial preconditioning operation in which the tunnel diodes TD1 and TD2 of detectors D1 through D3 are preset into their initial low level voltage state by the actuation of reset switch 58, the search word or the word that is to be compared to memory words MW–1 through MW–3 of search memory array 56 is inserted into search register 60. This search is then conducted by initially driving all the serially coupled corresponding highest ordered bits of the memory words according to the search word bit while concurrently coupling the mismatch transfer signal 44 to detectors D1 through D3 by activation of mismatch transfer signal generator 62—see FIG. 3—with the search continued by bit serially driving the serially coupled corresponding ordered bits of the memory words from the highest to the lowest ordered bits of the search word while concurrently coupling the mismatch transfer signal 44 to detectors D1 through D3. After the bit serial search is completed, detectors D1 through D3 have on their respective output terminals, signal levels indicative of the results of the search operation. Address generator 64 in turn then provides an output signal indicative of the addresses of the particular memory words that fulfill the equality search function.

Preparatory to a further discussion of the search memory system of FIG. 4 it is necessary to discuss the function of the mismatch transfer signal 44 with respect to some of the various search functions that may be performed by the system of FIG. 4. Assume that three search functions are to be discussed: equality; equal to or greater than; and, equal to or less than. For an equality search a mismatch transfer signal is concurrently coupled to the detectors with the coupling of a "1" or a "0" signal from the search register to the corresponding ordered bits of the memory words. However, for an equal to or greater than search the mismatch transfer signal is concurrently coupled to the detectors only with the coupling of a "1" signal from the search register to the corresponding ordered bits of the memory words while for an equal to or less than search the mismatch transfer signal is concurrently coupled to the detectors only with the coupling of a "0" signal from the search register to the corresponding ordered bits of the memory words. Further discussion of the search functions will indicate such modes of operation.

As an example of the above assume that an equality search is to be conducted on the system of FIG. 4. Assume that the words in the search register 60 and search memory array 56 are multibit binary words in which the top-most bit is the highest ordered bit and the bottom-most bit is the lowest ordered bit of the general form of an $n$ bit word $B_{n-1}B_{n-2}$—$B_0$ and that the multibit binary words are as indicated in the respective stages of search register 60 and the ordered bit positions of memory words MW–1, MW–2 and MW–3 of such memory array 56. Inspection of the search memory system of FIG. 4 indicates array 56 by way of drive line 77. Inspection of the con-that MW–1 is greater than the word in search register 60, that MW–2 is less than the word in search register 60 and that MW–3 is equal to the word in search register 60. Accordingly, after the performance of an equality search detectors D1 and D2 should indicate a mismatch condition while D3 should indicate a match condition. With detectors D1, D2 and D3 in their proper preset condition the equality search function is initiated by the highest ordered bit position 68 of search register 60 coupling a signal 70 indicative of a "1" to the corresponding ordered bits of memory words MW–1, MW–2 and MW–3 by way of drive line 71. The highest ordered bit of MW–2 is the only bit position in which a mismatch is found which mismatch couples a mismatch signal 40 to its output line 72 which mismatch signal, or search memory array 56 output signal, sets tunnel diode TD1 of detector D2 into its high voltage state concurrently with the application of mismatch transfer signal 44 which concurrent action of signals 40 and 44 at detector D2 sets tunnel diode TD2 of detector D2 into its high voltage state indicative of a mismatch condition—see FIG. 3*c*. Consequently, after the search of the highest ordered bits of memory words MW–1, MW–2 and MW–3 detector D2 has been set into a mismatch condition indicating that MW–2 is not equal to the search word stored in search register 60. Next, with the continuation of the bit serial search of the search memory system of FIG. 4 the second highest stage 74 of search register 60 couples signal 76 indicative of a "0" to the corresponding ordered bits of the memory words of search memory array 56 by way of drive line 77. Inspection of the contents of search memory array 56 indicates that only the second highest ordered bit of memory word MW–1 has a mismatch condition whereby the appropriate mismatch signal 40 is coupled to its output line 78 and thence to detector D1 where as before, the concurrent action of signals 40 and 44 at detector D1 sets tunnel diode TD2, as well as tunnel diode TD1 of detector D1 into its high voltage state indicative of a mismatch condition. Lastly, the lowest ordered bit stage 80 of search register 60 couples signal 72 indicative of a "1" to the corresponding ordered bits of the memory words of search memory array 56 by way of drive line 83. As before, inspection of the contents of search memory array 56 indicates that the lowest ordered bit of memory word MW–1 is the only bit which is in a mismatch condition. Accordingly, there is induced on line 78 a mismatch signal 40 which as before is concurrently coupled to detector D1 with mismatch transfer signal 44. However, as detector D1 has previously been set into a mismatch condition, i.e., having a high level voltage signal output, detector D1 is uneffected by the concurrence of signals 40 and 44 and remains in its previously mismatch set state effectively providing the "lock-out" of any mismatch signal subsequent to a first mismatch signal. As there has been no mismatch condition located at memory word MW–3 during the equality search function no mismatch signal 40 has been coupled to its output line 86 whereby its associated detector D3 has remained in its initial preset state producing a low level voltage signal at its output indicative of a match condition. After completion of the equality search function operation, address encoder 64 may be interrogated by a proper signal causing it to emit appropriate signals indicative of the address of memory word MW–3 it being the only memory word whose associated detector couples a low level match signal thereto.

As a further example, assume that an equal to or greater than search is to be conducted on the system of FIG. 4 utilizing the same multibit binary words in search register 60 and search memory array 56 as were discussed previously with respect to the equality search operation. Inspection of the search memory system of FIG. 4 indicates that MW–2 is the only word that is not equal to or greater than the multibit binary word held in search register 60. Accordingly, after the performance of an equal to or greater than search detector D2 should indicate a mismatch condition while detectors D1 and D3 should indicate a match condition. With detectors D1, D2 and D3 in their proper preset condition the equal to or greater than search function is initiated by the highest ordered bit position 68 of search register 60 coupling a signal 70 indicative of a "1" to the corresponding ordered bits of memory words MW–1, MW–2, MW–3 by way of drive line 71. The highest ordered bit of MW–2 is the only bit position in which a mismatch is found which mismatch couples a mismatch signal 40—see FIG. 3*c*—to its output line 72 which mismatch signal, or search memory array 56 output signal, sets tunnel diode TD1 of detector D2 into its high voltage state. As the respective bit in search register 60 is a "1" mismatch transfer signal generator 62 couples a mismatch transfer signal 44 to detectors D1, D2 and D3. The concurrent action of signals 40 and 44 at detector D2 sets tunnel diode TD2 of detector D2 into its high voltage state indicative of a mismatch condition—see FIG. 3*c*. Consequently, after the search of the highest ordered bits of memory words MW–1, MW–2 and MW–3 detector D2 has been set into a mismatch condition indicating that MW–2 is not equal to or greater than the search word stored in search register 60. Next, with the continuation of the bit serial search of search memory system of FIG. 4, the second highest stage 74 of search register 60 couples signal 76 indicative of a "0" to the corresponding ordered bits of the memory words of search memory array 56 by way of drive line 77. Inspection of the contents of search memory array 56 indicates that only the second highest ordered bit of memory word MW–1 has a mismatch condition whereby the appropriate mismatch signal 40 is coupled to its output line 78 and thence to detector D1. As stated hereinbefore for an equal to or greater than search if the respective bit in the search register 60 is a "1" the mismatch transfer signal generator 62 is activated to couple mismatch transfer signal 44 to detectors D1, D2 and D3 while if the respective bit in the search register 60 is a "0" mismatch transfer signal generator 62 is not activated; consequently, no mismatch transfer signal 44 is coupled to detectors D1, D2 and D3. Accordingly, as the respective bit in search register 60 is a "0" no mismatch transfer signal 44 from mismatch transfer signal generator 62 is coupled to detector D1 concurrently with mismatch transfer signal 40 from memory word MW–1. Therefore, tunnel diode TD1 of detector D1 is set into its high voltage state but tunnel diode TD2 of detector D1 is not set into its high voltage state due to the lack of the necessary coupling action provided by mismatch transfer signal 44—see FIG. 3*b*.

Thus, at the completion of the comparison of the first two highest ordered bits of the multibit word in search register 60 the status of detectors D1, D2 and D3 is as follows:

Detector D1—Tunnel diode TD1 is in its high voltage state, tunnel diode TD2 is in its low voltage state, thus, detector D1 is in a "lock-out" condition indicative of a "greater than" find.

Detector D2—Tunnel diode TD1 is in its high voltage state, tunnel diode TD2 is in its high voltage state, thus, detector D2 is in a "lock-out" mismatch condition indicative of a "less than" find.

Detector D3—Tunnel diode TD1 is in its low voltage state, tunnel diode TD2 is in its low voltage state, thus, detector D3 is in its initial preset condition indicative of an "equality" find.

Lastly, the lowest ordered bit stage 80 of search register 60 couples signal 82 indicative of a "1" to the corresponding ordered bits of the memory words of search memory array 56 by way of drive line 83. As before, inspection of the contents of search memory array 56 indicates that the lowest ordered bit of memory word MW–1 is the only bit which is in a mismatch condition. Accordingly, there is induced on line 78 a mismatch signal 40 which, as before, is concurrently coupled to detector D1 with mismatch transfer signal 44. However, as tunnel diode TD1 of detector D1 has previously been set into its high voltage state detector D1 is uneffected by the concurrence of signals 40 and 44 and remains in its previously mismatch set state indicative of a "greater than" find effectively providing the "lock-out" of any mismatch signal subsequently applied thereto. Accordingly, after completion of the equal to or greater than search function, detector D2 is the only detector producing a high level mismatch voltage signal at its output while detectors D1 and D3 produce a low level voltage match signal at their outputs. After completion of the equal to or greater than search function operation address encoder 64 may be interrogated by a proper signal causing it to emit appropriate signals indicative of the addresses of memory words MS–1 and MW–3; they being the only memory words whose associated detectors couple a low level match signal thereto.

In view of the above discussion it is apparent to one of ordinary skill in the art that the search memory system of FIG. 4 may perform many search functions other than those above described in detail. Masking of predetermined memory words can be accomplished by the setting of tunnel diodes TD1 of the associated detectors into their high voltage state by a suitable signal prior to initiation of the search function. Additionally, mixed search functions can be accomplished by the selective operation of switches S1 for resetting the associated tunnel diodes TD1 into their preset condition between search operations. Further, although the embodiment of FIG. 4 utilizes the driving of the bits of the memory words by unique signals—a positive pulse for a "1" and a negative pulse for a "0" such is not to be construed as a limitation thereto. The hereinbefore mentioned true-complement search memory system may be utilized as well. Still further, the unique driving or not driving of the bits of the memory words as a function of the bits of the search register could be accomplished by the driving of one of the extra bits of a Biax system using two extra Biax elements per word; one each for the comparison of a "1" or of a "0."

It is understood that suitable modifications may be made in the structure as disclosed provided such modifications come within the spirit and scope of the appended claims. Having now, therefore, fully illustrated and described my invention, what I claim to be new and desire to protect by Letters Patent is set forth in the appended claims:

I claim:

1. A search memory system match logic circuit, comprising:
first and second tunnel diodes each having an anode and a cathode;
a capacitor means intercoupling the anodes of said first and second tunnel diodes for forming first and second junctions at said first and second anodes, respectively;
means coupled to said first junction for receiving an input signal;
means coupled to said second junction for receiving a clock signal;
means coupled to said second junction for receiving an output signal;
a resistor and a switch means associated with and serially intercoupling said first junction and a first reference potential;
a resistor and a switch means associated with and serially intercoupling said second junction and a second reference potential;
means for coupling the cathode of said first tunnel diode to a third reference potential;
means for coupling the cathode of said second tunnel diode to a fourth reference potential;
said first, second, third and fourth reference potentials setting said first and second tunnel diodes into their low voltage state defining a preset condition;
said input signal when coupled to said first junction switching said first tunnel diode into its high voltage state;
said input signal and said clock signal when concurrently coupled to said first junction and to said second junction, respectively, switching said second tunnel diode into its high voltage state.

2. The circuit of claim 1 wherein the voltage change due to said first tunnel diode switching from its low voltage state to its high voltage state is A.C. coupled to said second junction by said capacitor means.

3. The circuit of claim 2 wherein each of said switch means resets its associated tunnel diode into its low voltage preset condition.

4. The circuit of claim 1 wherein said output signal is a bilevel voltage signal representative of the voltage state of said second tunnel diode.

5. A search memory system match logic circuit, comprising:
first and second tunnel diodes each having an anode and a cathode;
A.C. coupling means intercoupling the anodes of said first and second tunnel diodes for forming first and second junctions at said anodes, respectively;
means coupled to said first junction for receiving an input signal;
means coupled to said second junction for receiving a clock signal;
means coupled to said second junction for receiving an output signal;
means including a resistor means for coupling said first junction to a first reference potential;
means including a resistor means for coupling said second junction to a second reference potential;
means for coupling the cathode of said first tunnel diode to a third reference potential;
means for coupling the cathode of said second tunnel diode to a fourth reference potential;
said first, second, third and fourth reference potentials setting said first and second tunnel diodes into their low voltage states defining a preset condition;
said input signal when coupled to said first junction setting only said first tunnel diode into its high voltage state;
said input signal and said clock signal when concurrently coupled to said first junction and to said second junction, respectively, setting both of said first and second tunnel diodes into their high voltage states.

6. The circuit of claim 5 wherein the voltage change due to said first tunnel diode switching from its low voltage state to its high voltage state is A.C. coupled to said second junction by said A.C. coupling means and wherein the D.C. voltage state of said first tunnel diode is decoupled from said second junction by said A.C. coupling means.

7. A search memory system match logic circuit, comprising:
first and second tunnel diodes each having an anode and a cathode;
a capacitor means intercoupling the anodes of said first and second tunnel diodes for forming first and second junctions at said anodes, respectively;
means coupled to said first junction for receiving an input signal;
means including a resistor means coupled to said second junction for receiving a clock signal;
means coupled to said second junction for receiving an output signal;
a resistor and a switch means associated with and serially intercoupling said first junction and a first reference potential;
a resistor and a switch means associated with and serially intercoupling said second junction and a second reference potential;
means for coupling the cathode of said first tunnel diode to a third reference potential;
means for coupling the cathode of said second tunnel diode to a fourth reference potential;
said first, second, third and fourth reference potentials setting said first and second tunnel diodes into their low voltage state defining a preset condition;
said input signal when coupled to said first junction switching said first tunnel diode into its high voltage state;

said input signal and said clock signal when concurrently coupled to said first junction and to said second junction, respectively, switching both of said first and second tunnel diodes into their high voltage states.

8. A search memory system match logic circuit, comprising:

first and second tunnel diodes each having an anode and a cathode;

a capacitor means intercoupling the anodes of said first and second tunnel diodes for forming first and second junctions at said anodes, respectively;

a resistor and a switch means serially intercoupling said first junction and a first reference potential;

a serially arranged resistor means and a switch means associated with and intercoupling said second junction and a second reference potential;

means for coupling the cathode of said first tunnel diode to a third reference potential;

means for coupling the cathode of said second tunnel diode to a fourth reference potential;

said first, second, third and fourth reference potentials setting said first and second tunnel diodes into their low voltage state defining a preset condition;

input signal generator means coupled to said first junction for coupling an input signal thereto;

clock signal generator means coupled to said second junction for coupling a clock signal thereto;

utilization means coupled to said second junction for receiving an output signal therefrom;

said input signal when coupled to said first junction switching only said first tunnel diode into its high voltage state;

said input signal and said clock signal when concurrently coupled to said first junction and to said second junction, respectively, switching said first and second tunnel diodes into their high voltage state.

9. The circuit of claim 8 wherein the voltage change due to said first tunnel diode switching from its low voltage state to its high voltage is A.C. coupled to said second junction by said capacitor means.

10. The circuit of claim 9 wherein each of said switch means resets its associated tunnel diode into its low voltage preset condition.

11. The circuit of claim 8 wherein said output signal is a bilevel voltage signal representative of the voltage state of said second tunnel diode.

12. A search memory system match logic circuit, comprising:

first and second tunnel diodes each having an anode and a cathode;

A.C. coupling means intercoupling the anodes of said first and second tunnel diodes for forming first and second junctions at said anodes respectively, and for decoupling the D.C. voltage state of said first tunnel diode from said second junction;

a resistor and a switch means serially intercoupling said first junction and a first reference potential;

a resistor and a switch means serially intercoupling said second junction and a second reference potential;

means for coupling the cathode of said first tunnel diode to a third reference potential;

means for coupling the cathode of said second tunnel diode to a fourth reference potential;

said first, second, third and fourth reference potentials setting the said first and second tunnel diodes into their low voltage state defining a preset condition;

input signal generator means coupled to said first junction for coupling an input signal thereto;

clock signal generator means coupled to said second junction for coupling a clock signal thereto;

utilization means coupled to said second junction for receiving an output signal therefrom;

said input signal when coupled to said first junction switching only said first tunnel diode into its high voltage state;

said input signal and said clock signal when concurrently coupled to said first junction and to said second junction, respectively, switching said second tunnel diode into its high voltage state.

13. A search memory system for the bit serial comparison of a search word to a plurality of memory words to provide a specified search function find indication, comprising:

a search register for holding a multibit search word;

a search memory for holding a plurality of multibit memory words;

a plurality of detector means;

an address generator means;

each ordered bit of said search word as held in each correspondingly ordered search register stage separately coupled to only the like ordered bits of said memory words;

a separate sense line separately coupling all the bits of each memory word to an associated separate one of said detector means;

said search register performing a bit serial comparison of each bit of the multibit search word, from the highest to the lowest ordered bit, by coupling a drive signal from each separate register bit position to all the like ordered bits of the memory words;

a mismatch of a search register bit with a like ordered bit of a memory word generating a mismatch signal in said mismatched bit's coupled sense line;

a mismatch transfer signal generator for coupling a mismatch transfer signal to said detectors;

each of said detector means including:

first and second tunnel diodes each having an anode and a cathode;

an A.C. coupling means intercoupling the anodes of said first and second tunnel diodes for forming first and second junctions at said anodes, respectively;

means for coupling said first junction to a first reference potential;

means for coupling said second junction to a second reference potential;

means for coupling the cathode of said first tunnel diode to a third reference potential;

means for coupling the cathode of said second tunnel diode to a fourth reference potential;

means for coupling said second junction to said mismatch transfer signal generator;

means coupling said second junction to said address generator;

means coupling said first junction to the associated memory word sense line;

said first, second, third and fourth reference potentials setting said first and second tunnel diodes into their low voltage stage defining a preset condition;

an initial one of said mismatch signals when coupled to said associated sense line switching the associated first tunnel diode from its preset low voltage state to its high voltage state;

said associated first tunnel diode when switching from its preset low voltage state into its high voltage state due to the application of said mismatch signal generating a switching voltage that is A.C. coupled by said A.C. coupling means to said second junction;

said switching voltage alone incapable of switching said second tunnel diode from its preset low voltage state into its high voltage state;

the concurrent coaction of said mismatch transfer signal and said switching signal capable of switching said second tunnel diode from its preset low voltage state into its high voltage state;

means coupling an output signal from said second junction to said address generator means;

said output signal being a bilevel voltage signal representative of the voltage state of its associated second tunnel diode.

14. A search memory system for the bit serial comparison of a search word to a plurality of memory words to provide a specified search function find indication, comprising:

a search register for holding a multibit search word;

a search memory for holding a plurality of multibit memory words;

a plurality of detector means;

an address generator means;

each ordered bit of said search word as held in each correspondingly ordered search register stage separately coupled to only the like ordered bits of said memory words;

a separate sense line separately coupling all the bits of each memory word to an associated separate one of said detector means;

said search register performing a bit serial comparison of each bit of the multibit search word, from the highest to the lowest ordered bit, by coupling a drive signal from each separate register bit position to all the like ordered bits of the memory words;

a mismatch of a search register bit with a like ordered bit of a memory word generating a mismatch signal in said mismatched bit's coupled sense line;

a mismatch transfer signal generator for simultaneously coupling a mismatch transfer signal to all of said detectors;

a reset switch means coupled to all of said detectors;

each of said detector means including:

first and second tunnel diodes each having an anode and a cathode;

an A.C. coupling means intercoupling the anodes of said first and second tunnel diodes for forming first and second junctions at said anodes, respectively, and for decoupling the D.C. voltage state of said first tunnel diode from said second junction;

a resistor and a reset switch means serially intercoupling said first junction and a first reference potential;

a resistor and a reset switch means serially intercoupling said second junction and a second reference potential;

means for coupling the cathode of said first tunnel diode to a third reference potential;

means for coupling the cathode of said second tunnel diode to a fourth reference potential;

means for coupling said second junction to said mismatch transfer signal generator;

means coupling said second junction to said address generator;

means coupling said first junction to the associated memory word sense line;

said first, second, third and fourth reference potentials setting said first and second tunnel diodes in their low voltage states defining a preset condition;

an initial one of said mismatch signals when coupled to said first junction switching the associated first tunnel diode from its preset low voltage state to its high voltage state;

said associated first tunnel diode when switching from its preset low voltage state into its high voltage state due to the application of said mismatch signal generating a switching voltage that is A.C. coupled by said A.C. coupling means to said second junction;

said switching voltage incapable of switching said second tunnel diode from its preset low voltage state into its high voltage state;

the concurrent coaction of said mismatch transfer signal and said switching signal capable of switching said second tunnel diode from its preset low voltage state into its high voltage state;

means coupling an output signal from said second junction to said address generator means;

said output signal being a bilevel voltage signal representative of the voltage state of its associated second tunnel diode.

15. A search memory system match logic circuit, comprising:

first and second tunnel diodes each having an anode and a cathode;

means for biasing said first and second tunnel diodes into their low voltage states;

capacitor means intercoupling the anodes of said first and second tunnel diodes for forming first and second junctions at said anodes, respectively;

means coupled to said first junction for receiving a first polarity input signal;

means coupled to said second junction for receiving a first polarity clock signal;

said input signal when coupled to said first junction individually capable of switching only said first tunnel diode from its low voltage state into its high voltage state;

said clock signal when coupled to said second junction individually incapable of switching the voltage states of said first or second tunnel diodes;

only the concurrent coupling of said input signal to said first junction and switching said first tunnel diode from its low voltage state into its high voltage state and the coupling of said clock signal to said second junction capable of switching said second tunnel diode from its low voltage state into its high voltage state.

16. The circuit of claim 15 wherein said input signal is bipolar having first and second polarity portions.

17. The circuit of claim 16 wherein said bias means includes switch means for individually switching said first and second tunnel diodes from their high voltage states into their low voltage states.

18. The circuit of claim 17 wherein the low and high voltage states of said first tunnel diode are substantially lower than the low and high voltage states of said second tunnel diode, respectively.

References Cited by the Examiner

UNITED STATES PATENTS

| | | | |
|---|---|---|---|
| 3,103,600 | 9/1963 | Lewin | 307—88.5 |
| 3,198,960 | 8/1965 | Kruy | 307—88.5 |
| 3,221,179 | 11/1965 | Smalley et al. | 307—88.5 |

References Cited by the Applicant

UNITED STATES PATENTS

| | | |
|---|---|---|
| 3,182,204 | 5/1965 | Galletti. |
| 3,198,959 | 8/1965 | Sear. |
| 3,196,288 | 7/1965 | Chow. |

OTHER REFERENCES

Esaki Diode Binary Counter, A. J. Gruodis, IBM Technical Disclosure Bulletin, vol. 3, No. 9, February 1961.

Esaki Diode NOT-OR Logic Circuits, H. S. Yourke et al., IRE Proceedings on Electronic Computers, June 1961, pp. 183–190.

Tunnel and Uni-tunnel Diode Applications, Electrical Design News, March 1961, pp. 86–101.

Tunnel Diode Logic Circuits, Electronic Design, October 11, 1962, pp. 104–109.

Tunnel Diode Scale-of-two Counters, R. L. Watters, Electronic Equipment Engineering, November 1961, pp. 59–60.

ARTHUR GAUSS, *Primary Examiner.*

B. P. DAVES, *Assistant Examiner.*